Feb. 10, 1970      C. J. COBERLY ET AL      3,494,642
FRICTION-TYPE JOINT WITH DIFFERENT MODULI OF ELASTICITY
Filed Jan. 10, 1968
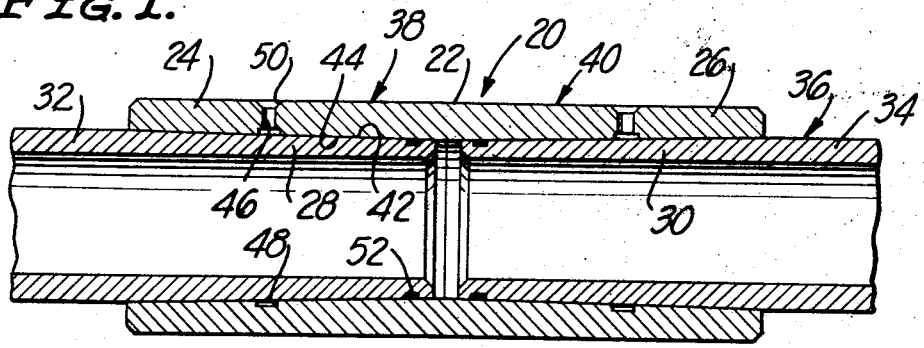
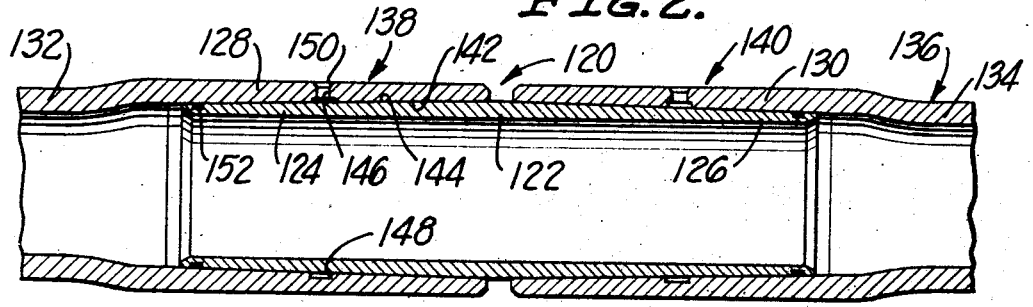
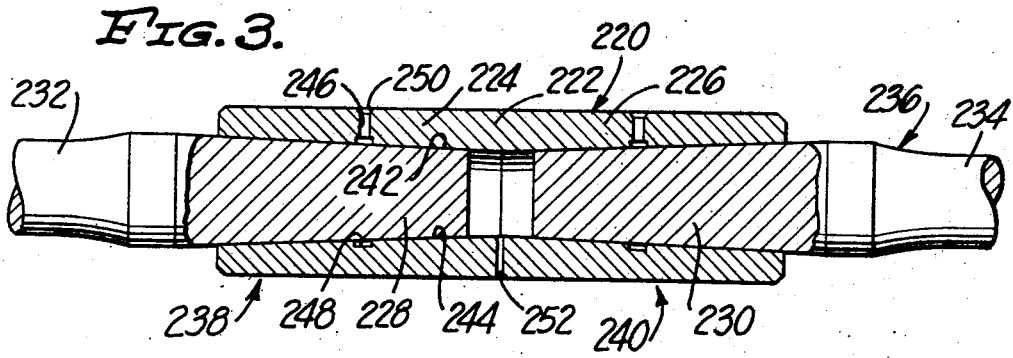
INVENTORS
CLARENCE J. COBERLY,
FRANCIS BARTON BROWN
BY THEIR ATTORNEYS
HARRIS, KIECH, RUSSELL & KERN 3,494,642
FRICTION-TYPE JOINT WITH DIFFERENT MODULI OF ELASTICITY
Clarence J. Coberly, San Marino, and Francis Barton Brown, La Crescenta, Calif., assignors to Kobe, Inc., Huntington Park, Calif., a corporation of California
Continuation-in-part of application Ser. No. 325,707, Nov. 22, 1963. This application Jan. 10, 1968, Ser. No. 696,843
Int. Cl. F16l 21/00, 37/00, 25/00
U.S. Cl. 285—329
7 Claims

ABSTRACT OF THE DISCLOSURE

A friction-type rod or tubing joint the outer member of which has a lower modulus of elasticity than the inner member. Consequently, upon application of an axial tension load to the joint, the outer member contracts relative to the inner member to increase the engagement pressure btween the members, and thus the frictional resistance to relative displacement of the members.

CROSS-REFERENCE TO RELATED APPLICATION

This application is a continuation-in-part of our copending application Ser. No. 325,707, filed Nov. 22, 1963 now Patent No. 3,451,119.

BACKGROUND OF INVENTION

The present invention relates in general to a high-strength, friction-type joint for interconnecting such elongated elements as tubings or rods, usually in end-to-end, aligned relation, to form tubing or rod strings capable of withstanding high axial and/or torsion loads, and/or, in the case of tubing strings, high internal pressures.

A tubing or rod string incorporating the high-strength, friction-type joint of the invention may include any number of tubings or rods oriented in any direction. One important use of such a rod or tubing string is in a well with the string oriented vertically and subjected to high axial tension loads due to its weight. Additionally, such high axial tension loads may be due in part to a high internal pressure in the case of a tubing string, or a high pumping load in the case of a rod string. Alternatively, or additionally, the string may be subjected to high torsion loads, as in the case of a drill string.

The term "tubing" is used herein to include tubes or pipes of any lengths and wall thicknesses. Tubings may be classed as thin walled or thick walled relative to their outer diameters. Such classes of tubings differ in that, in a thin-walled tubing, any hoop stresses developed therein are substantially uniform throughout the thickness of the wall, whereas, in a thick-walled tubing, there is a distinct hoop stress gradient throughout the thickness of the wall. Tubings commonly used in oil wells may be regarded as falling into the thin-walled class, examples being tubings or pipes used in producing oil, drill pipe, casing, liners, and the like.

The term "rod" is used herein to cover solid, i.e., nontubular, elongated elements. Rod strings are widely used in the oil industry for transmitting power from the surface to bottom hole pumps in oil wells, the rods commonly being referred to as "sucker rods."

Friction-type joints with which the method and apparatus of the invention may be used rely for axial and torsional strength predominantly or exclusively on frictional resistance to relative bodily displacement of axially tapered surfaces of an inner member and an outer, tubular member fitted over the inner member, the tapered surfaces being frictionally interengaged, usually in direct physical contact, with a high engagement or contact pressure therebetween along an interface which is substantially continuous and tapers substantially uniformly throughout the axial length of frictional interengagement between said tapered surfaces, and which has a small included angle. Both such members may be adjacent ends or end portions of adjoining elongated elements, or one may be an end or end portion of an elongated element and the other an end or end portion of a coupling. Normally, the coupling will have oppositely tapered end portions for pressural interengagement with complementarily tapered surfaces of adjacent ends of two elongated elements to be interconnected by the coupling. In most instances, the coupling is tubular and may be either internal or external with respect to the tubing or rod ends to be interconnected thereby.

It is important that the strength of such a friction-type joint against relative bodily displacement of its tapered surfaces should be at least nearly equal to the yield strength of the elongated elements it interconnects. While stresses in rod or tubing strings used in oil wells are within the elastic limit of the rods or tubings during normal use, it is important that none of the joints fail if higher stresses are transiently developed under usual conditions. Under such circumstances, it is important that axial tension loads, for example, up to the yield strength, or even the ultimate strength, of the rods or tubings be applicable to the rod or tubing strings without failure of the joints thereof.

All conventional rod or tubing joints now in use are of the threaded variety and costly upsetting and heat treatment is required if the joint strength is to equal or exceed the tensile strength of the rod or tubing. In addition, threaded joints are necessarily bulky and occupy valuable space in the well. For example, it is often necessary to run two or more tubing strings side by side in a well casing and the size of conventional threaded joints limits the number of tubing strings that can be placed in the casing, or requires an increase in the size of the casing. It is a feature of the present friction-type joint that rods or tubings can be adequately connected in a rod or tubing string thereby in much less space than threaded joints. As compared with conventional practice, it is usually possible to employ well casings two full sizes smaller to contain an array of two or more parallel tubing strings, resulting in substantial savings in drilling and casing costs. Conversely, it becomes possible to use more or larger tubing strings in any existing casing or well. Generally similar considerations are applicable to rod strings using such a friction-type joint.

The strength of the present friction-type joint depends primarily on three factors, viz., the actual length of the interface throughout which the tapered surfaces are in pressural engagement, the effective coefficient of friction between the tapered surfaces, and the engagement pressure therebetween. The tapered angle should be relatively small, but can vary throughout a relatively wide range as hereinafter discussed. It is desirable to provide the joint with a relatively high effective coefficient of friction and a very high engagement pressure between the tapered surfaces so that the length of the tapered surfaces in pressural interengagement can be relatively small. The foregoing factors can be so related as to produce a joint strength which is at least substantially equal to the yield strength of the rods or tubings interconnected by the joint, and which may equal or exceed the ultimate strength of the rods or tubings so that failure will occur in one of the rods or tubings, and not in the joint.

The desired high engagement pressure between the tapered surfaces of the inner and outer members of the friction-type joint is the result of a high hoop tension stress in the outer member and an opposing high compression stress in the inner member. To achieve maximum joint strength, these stresses approximate, but are slightly below, the yield strengths of the materials of the two members.

The high hoop tension stress in the outer member establishes therein an initial axial compression stress which tends to reduce the axial length of the outer member and tends to increase its taper angle to a related extent. Likewise, the opposing high compression stress in the inner member establishes therein an initial axial tension which similarly tends to lengthen the inner member and tends to decrease its tapered angle. However, it has been found that the actual taper-angle changes are insignificant and do not affect the joint strength significantly.

Still another factor is that in applying an axial make up force to the members in making up the joint, the inner member may be subjected to an axial compressive stress tending to increase its diameter. Upon relaxation of the make up force, the diameter of the inner member tends to decrease to its original value, which would appear to tend to weaken the joint by reducing the engagement pressure. However, this effect has been found to be insignificant.

An external axial load applied to one of the members of the joint is transferred progressively to the other along the length of the interface throughout which the two tapered surfaces are pressurally interengaged. An axial tensile stress due to an axial tension load is additive with respect to the initial axial tension stress in the inner member. Likewise, the axial tension stress due to such an axial load reduces the initial axial compression stress in the outer member to the point of changing it to a net axial tension stress along most of the length of the interface.

The engagement pressure between the tapered surfaces induced by the hoop tension and compression stresses in the outer and inner members changes upon application of such an axial load to one of the members. If it is assumed that initially the engagement pressure of interference fit between the surfaces was uniform along the interface, application of such an axial load will increase the contact pressure or interference fit near one end of the interface and decrease same near the other end thereof, only an intermediate portion of the interface being free of such effects. Likewise, application of such an axial load has been found to cause relative axial movement between the engaged tapered surfaces at positions near the ends of the interface.

It thus becomes apparent that any analysis of the stresses in the joint under initial and loaded conditions becomes extremely complex. Many of the factors noted above as concerns initial stress and change in stress upon axial loading might seem to indicate that no friction-type joint could be designed that would not pull apart at loads equal to the nominal yield strength or the nominal ultimate strength of the rods or tubings. Tests have shown, however, that a friction-type joint can be provided meeting these conditions without failure. It has been found that the change in axial stress in the members due to axial loading, change in engagement pressure or interference fit between the tapered surfaces upon such loading, and the relative movement between such surfaces upon such loading, are not such as to preclude a friction-type joint having a strength greater than the yield or even the ultimate strength of the rods or tubings.

The tapered surfaces of the inner and outer members may be in direct physical contact along the interface and may be roughened to increase the effective coefficient of friction therebetween. Alternatively, the tapered surfaces may be in pressural interengagement without direct physical contact, but with a keying agent disposed between and embedded in the tapered surfaces along the interface to increase the effective coefficient of friction therebetween, particularly where the joint must resist relative bodily displacement of the tapered surfaces under torsional stress.

Preferably, in instances where adjacent rod or tubing ends are interconnected by couplings, the rod or tubing ends are cold worked to provide same with higher unit yield strengths than the nominal yield strengths of the bodies of the rods or tubings, thereby increasing the overall strengths of the joints.

In most of the friction-type joints hereinafter considered, the tapered surfaces are unthreaded and the joints are made up by relative axial displacement of the inner and outer members without relative rotation thereof. In some instances, however, the tapered surfaces may be provided with shallow, wide, tapered threads having flat crest and root surfaces which form the pressurally interengaged tapered surfaces serving to frictionally prevent relative bodily displacement of the inner and outer members. In this instance, the threads merely serve to relatively axially displace the inner and outer members in response to rotation thereof, the inner and outer members being held together primarily by friction resulting from pressural interengagement of the root and crest surfaces, and only incidentally by any mechanical interlock between the threads.

The invention further contemplates achieving the desired high hoop tension and compression stresses in the outer and inner members by shrinking the outer member on the inner, and, more particularly, by shrinking the outer member on the inner hydraulically. This permits the joint to be made up easily, and also permits the joint to be broken readily. Also, the joint may be made up and broken repeatedly in this manner.

More specifically, the invention contemplates hydraulically shrinking the outer member on the inner in such a manner that the materials of the outer and inner members are stressed substantially to, but not quite to, their yield points to achieve the maximum possible engagement pressure between the tapered surfaces of the members, whereby to achieve maximum joint strength. Preferably, a fluid, such as oil, is injected into an axially central region of the interface between the tapered surfaces of the inner and outer members under sufficient pressure to stress the materials of these members substantially to, but not quite to, their respective yield points in the central region, which results in radial separation of the tapered surfaces in such region. The injected fluid is prevented from escaping from the central region by sealing engagement of the tapered surfaces in annular sealing regions at opposite ends of the central region.

In making up the tapered joint in accordance with the foregoing, the inner and outer members are relatively moved axially into successively further inserted positions of the inner member as the pressure of the fluid injected into the central region of the interface builds up, simultaneously relatively rotating the members if the tapered surfaces are threaded, thereby maintaining the tapered surfaces in sealing engagement in the sealing regions at the ends of the central region. When the injection pressure and the axial make up force reach their maximum values, the joint is fully made up and the pressure of the injected fluid in the central region is reduced substantially to atmospheric to permit outward expansion of the contracted portion of the inner member and inward contraction of the expanded portion of the outer member, thereby producing the desired high engagement pressure between the tapered surfaces of the two members with hoop tension and compression stresses in the outer and inner members substantially, but not quite, equal to the yield points of the materials of these members.

In breaking the joint, the foregoing procedure is essentially reversed, the pressure of the injected fluid in the central region serving to separate the tapered surfaces of the inner and outer members in this region so that the inner and outer members may be axially separated. Such axial separation is produced entirely by, or at least aided by, the action of the pressure of the injected fluid on the projected areas of the tapered surfaces.

Only the relatively light engagement pressures are necessary in the sealing regions to prevent the escape of the injected fluid from the central region in making up and breaking the joint, so that, with the foregoing procedure, the joint can be made up easily, and broken readily, without galling the tapered surfaces, irrespective of whether they are unthreaded or threaded. Consequently, the joint can be made up and broken repeatedly in accordance with the invention without impairing the effectiveness of the tapered surfaces which is an important feature.

OBJECTS OF INVENTION

With the foregoing as background, the primary object of the invention is to provide a high-strength, friction-type joint of the character outlined which is so constructed that the outer tubular member will grip the inner member more tightly upon the application of an axial tension load, the materials of the inner and outer members being so selected and related that the outer member contracts relative to the inner member, upon application of an axial tension load, so as to increase the engagement pressure between the tapered surfaces.

More particularly, the primary object of the invention is to utilize for the outer member of the joint a material having a significantly lower modulus of elasticity than the inner member. With this construction, the outer member contracts sufficiently relative to the inner, in response to an axial tension load, to produce a very substantial increase in the contact pressure between the tapered surfaces of the two members. Consequently, a joint strength at least as high as the ultimate strength of the rods or tubings can readily be achieved. Also, the length of the joint may be reduced for the same joint strength.

Preferably, steel tubings or rods are employed and important objects in this connection are to utilize a high strength aluminum alloy as the outer member of the joint, and steel as the inner member, and to utilize steel as the outer member, and tungsten as the inner. In either case, the desired lower modulus of elasticity for the outer member is achieved, with a steel rod or tubing, to achieve a joint strength at least as high as the ultimate rod or tubing strength, which are important features.

The foregoing objects, advantages, features and results of the present invention, together with various other objects, advantages, features and results thereof which will be evident to those skilled in the friction-type joint art in the light of this disclosure, may be achieved with the exemplary embodiments of the invention described in detail hereinafter and illustrated in the accompanying drawing.

DESCRIPTION OF DRAWING

In the drawing:

FIG. 1 is a longitudinal sectional view of a coupling-type tubing joint construction, utilizing an external coupling, which embodies the invention;

FIG. 2 is a longitudinal sectional view of a coupling-type tubing joint construction, utilizing an internal coupling, which embodies the invention; and FIG. 3 is a longitudinal sectional view of a coupling-type rod joint construction which embodies the invention.

BACKGROUND DESCRIPTION OF EXEMPLARY EMBODIMENTS OF INVENTION

Before describing the manner in which different moduli of elasticity are utilized in the various high-strength, friction-type joints of FIGS. 1 to 3, background descriptions of these joints will be introduced, primarily with reference to the external-coupling tubing joint construction of FIG. 1, and incidentally with reference to the internal-coupling tubing joint construction of FIG. 2 and the rod joint construction of FIG. 3. Thereafter, the effects of different moduli of elasticity in accordance with the invention will be discussed.

TUBING JOINT CONSTRUCTION 20

Referring to FIG. 1 of the drawing, illustrated therein is a coupling-type tubing joint construction 20 of the invention comprising an external coupling 22 the respective end portions or ends 24 and 26 of which receive therein, in closely spaced relation, adjacent end portions or ends 28 and 30 of tubings 32 and 34 forming a tubing string 36. The coupling and tubing ends 24 and 28 form a tubing joint 38 and the coupling and tubing ends 26 and 30 form a tubing joint 40. The two tubing joints 38 and 40 are identical so that only the former will be considered.

The inner member of the tubing joint 38, i.e., the tubing end 28, is provided with a tapered outer surface 42 which converges axially inwardly relative to the coupling 22. The outer member of the tubing joint 38 i.e., the coupling end 24, is provided with a complementarily tapered inner surface 44. The two tapered surfaces 42 and 44 are pressurally interengaged along the interface therebetween with a high engagement pressure induced by a high hoop tension stress in the coupling end 24 and an opposing high hoop compression stress in the tubing end 28, thereby producing a high frictional resistance to relative bodily displacement of the tapered surfaces, either axially or circumferentially.

The foregoing high frictional resistance to relative bodily displacement of the tapered surfaces 42 and 44 is preferably achieved by shrinking the coupling end 24 onto the tubing end 28, and particularly by hydraulically shrinking the coupling end onto the tubing end. Considering how this may be accomplished, the coupling end 24 is provided at approximately the axial midpoint of its tapered surface 44 with a port 46 for injecting a fluid, such as oil, under high pressure into the axially central region of the annular interface between the tapered surfaces 42 and 44. The port 46 communicates at its inner end with an internal annular groove 48 in the coupling end 24 at about the axial midpoint of the tapered surface 44, and is provided at its outer end with a radially-inwardly-convergent annular seat 50 for a suitable fluid injection nozzle.

In making up the tubing joint 38, the tubing end 28 is inserted in the coupling end 24 until the tapered surface 42 engages the tapered surface 44 in the central region of the interface therebetween and in annular sealing regions on axially opposite sides of the port 46. Oil, or other fluid, under high pressure, which pressure may be as high as 30,000 p.s.i., or more, is then injected into the annular central region of the interface between the two tapered surfaces, at the same time applying an axial make up force to the coupling 22 and the tubing 32 tending to further insert the tubing end 28 into the coupling end 24. The high fluid pressure within the central region of the interface expands the adjacent portion of the coupling end 24 outwardly and contracts the adjacent portion of the tubing end 28 inwardly, without, however, breaking contact in the annular sealing regions on axially opposite sides of the central region so long as a sufficiently high axial make up force is applied. This make up force must be high enough to resist the action of the injection pressure on the axially projected areas of the tapered surfaces 42 and 44. Thus, the injected fluid is trapped in the annular central region of the interface.

As the pressure of the trapped fluid builds up, the coupling and tubing ends 24 and 28 are caused to be moved axially toward each other by the axial make up force to increase the extent to which the tubing end is inserted into the coupling end. After the maximum injection pressure and the maximum axial make up force for which the tubing joint 38 is designed have been reached, the tubing end 28 is in effect "bottomed" within the coupling end 24. (Such "bottoming" is solely the result of interengagement of the tapered surfaces 42 and 44, there being no annular shoulders, or the like, to artificially limit insertion.) Then, the application of the injection pressure is discontinued and the excess injected fluid is permitted to escape through the port 46. This permits the outwardly expanded portion of the coupling end 24 to contract inwardly, and simultaneously permits the inwardly contracted portion of the tubing end 28 to expand outwardly. The result is that the coupling end 24 is shrunk onto the tubing end 28 with a high engagement pressure determined by the maximum injection pressure and the maximum axial make up force.

It will be apparent that, in order to break the tubing joint 38, a similar procedure is followed. The injection pressure acting on the axially projected areas of the tapered surfaces 42 and 44 is normally sufficient to produce axial separation of the coupling and tubing ends 24 and 28. Actually, it may be necessary to restrain such axial separation.

When making up and breaking the tubing joint 38, the major portions of the tapered surfaces 42 and 44 intermediate the ends thereof are physically separated by the injected fluid, the latter being trapped in the central region of the interface with contact pressures between the tapered surfaces at the ends of the interface which are not excessively high. Consequently, galling of the tapered surfaces 42 and 44 in response to relative axial movement thereof in making up and breaking the joint 38 does not occur despite very high engagement pressures between the tapered surfaces when the joint is made up. Therefore, the joint 38 may be made up and broken repeatedly.

An annular seal 52, shown as located in an external annular groove in the tubing end 28 adjacent its innermost extremity, may be disposed between the tapered surfaces 42 and 44 adjacent the inner end of the interface therebetween. This seal prevents any internal pressure which may be developed in the tubing string 36 in use from being applied to the interface between the tapered surfaces 42 and 44 to tend to break the tubing joint 38. Any internal fluid which may leak past the annular seal 52 into the interface between the tapered surfaces 42 and 44 escapes by way of the annular groove 48 and the port 46. Consequently, no joint-loosening pressure can build up in the interface, being constantly bled off.

It will also be noted from the foregoing that any internal pressure which may exist in the tubing string 36 in use merely tends to tighten the tubing joint 38 since it acts outwardly on the tubing end 28 to tend to expand it into more positive engagement with the coupling end 24. To prevent the internal pressure from having any significant expanding effect on the coupling 22 itself, the axial separation between the innermost extremities of the two tubing ends 28 and 30 is kept as small as practicable to minimize the coupling area on which the internal pressure can act.

With the foregoing as general background, various important considerations which enter into the structure of the tubing joint 38, and into the materials used for the coupling 22 and the tubing 32, will now be discussed. It should be kept in mind that, with exceptions which will be pointed out, these considerations are also applicable to the internal-coupling tubing joint and the rod joint species of the invention which will be described hereinafter.

In general, the axial length of the tapered surfaces 42 and 44 in pressural interengagement with each other, the engagement pressure between the tapered surfaces resulting from the hoop tension and compression stresses in the coupling and tubing ends 24 and 28, and the effective coefficient of friction between the surfaces, are so related as to produce a frictional resistance to relative bodily displacement of the tapered surfaces sufficiently high to develop a high-strength friction-type tubing joint 38, the joint strength being at least nearly equal to the nominal yield strength of the tubing 32 and, under some conditions, at least nearly equal to, or even exceeding, the ultimate strength of the tubing.

More particularly, the joint strength may be increased by increasing the axial length of pressural interengagement between the tapered surfaces 42 and 44, the effective coefficient of static friction therebetween, or the engagement pressure therebetween. To avoid an excessively long tubing joint 38, the axial length of the tapered surfaces 42 and 44 is preferably kept as small as possible, which means that it is necessary to make the engagement pressure and the effective coefficient of friction as high as possible, at the same time keeping the included angle of the tapered surfaces relatively small.

Considering the matter of the axial length of the interface between the tapered surfaces 42 and 44 in more detail, this length must be at least about 0.5 times the outside diameter of the body of the tubing 32 to obtain the desired high joint strength. However, the maximum axial length of the interface may be as much as about 6.0 times the outside diameter of the tubing 32 without being excessive for some applications, but is preferably not more than about 3.0 times the outside diameter of the tubing to be commercially practicable for all applications. (These ranges of ratios of the axial interface length to the outside diameter of the elongated element of the joint are also applicable to the other tubing and rod joint species hereinafter disclosed.)

The axial length of the tapered surfaces 42 and 44 in pressural interengagement in the made up tubing joint 38 may be minimized in various ways. One way is to utilize hoop tension and compression stresses in the coupling and tubing ends 24 and 28 which are as high as possible, thereby achieving as high an engagement pressure between the tapered surfaces as possible. Preferably, in the absence of applied loads, the hoop stresses are close to but slightly less than the respective yield points of the materials of which the coupling and tubing ends 24 and 28 are made. With stresses close to the yield points, the interface length to elongated-element outside diameter ratio discussed above may be held within the preferred range of 0.5 to 3.0. (Various factors involved in selecting materials for the coupling 22 and the tubing 32 will be considered hereinafter, as will various factors entering into the selection of radial dimensions for the coupling and tubing ends 24 and 28.)

The other principal factor determining the length of the interface between the tapered surfaces 42 and 44 is, as hereinbefore indicated, the effective coefficient of friction, which is preferably made as large as possible. With the materials normally used for tubings and couplings in the oil industry, and with the surface roughnesses normally encountered, the effective coefficient of friction is in the neighborhood of 0.20. However, in some instances, a value as low as about 0.1 may be used without departing from the interface length to elongated-element outside diameter ratio ranges given above. Also, much higher effective coefficients of friction much higher than this, up to as high as the order of 0.80, can be achieved. For example, either or both of the tapered surfaces 42 and 44 may be roughened artificially, as by knurling, etching, sand blasting, plating in such a way as to roughen, and the like. As another example, various keying agents capable of embedding themselves in the tapered surfaces 42 and 44 may be inserted therebetween.

The included angle of the tapered surfaces 42 and 44 enters into the axial length of engagement of the surfaces, but only to the extent of reducing the influence of the effective coefficient of friction by the tangent of one half its value. Theoretically, the included taper angle could be 0°, but, as a practical matter, to facilitate insertion of the tubing end 28 into the coupling end 24, and to limit the variation in depth of insertion of the tubing end into the coupling with practical diameters and angle tolerances the included angle taper should be not less than about 0° 30′.

The maximum included taper angle should not be more than about 4° where, as shown in FIG. 1 of the drawings, the wall thickness of the coupling and tubing ends 24 and 28 vary in the axial direction as the result of forming the tapered surfaces 42 and 44 by machining. It will be noted that the wall thickness of the tubing end 28 decreases in the direction of taper of the tapered surface 42, while the wall thickness of the coupling end 24 increases in the direction of taper of the tapered surface 44. This reduction in wall thickness should be limited to about 20%. High taper angles, e.g., up to about 18°, may be used if the wall thicknesses of the coupling and tubing ends 24 and 28 are constant.

The foregoing effective coefficient of friction and included taper angle ranges are also applicable to the tubing and rod joint species hereinafter disclosed.

Turning now to a discussion of still other important considerations involved in the tubing joint 38, it will be recalled that the high hoop tension and compression stresses in the coupling and tubing ends 24 and 28 respectively establish axial compression and tension stresses in the coupling and tubing ends. Consequently, an axial tension load applied to the tubing 32 tends to decrease the initial axial compression stress in the coupling end 24 and to increase the initial axial tension stress in the tubing end 28, the compression stress in the coupling end 24 reversing and becoming a net axial tension stress upon application of a sufficiently high axial tension load.

As the axial tension stress in the tubing end 28 exceeds the tensile yield stress, with the net axial tension stress in the coupling end 24 still within the elastic limit, the tubing end will tend to contract faster than the coupling end, with the result that the engagement pressure between the tapered surfaces 42 and 44 will be reduced, and with the ultimate result thta the tubing join 38 will fail by pulling the tubing end out of the coupling end. This effect is heightened by the initial axial tension stress in the tubing end 28 induced by the shrink fit between the coupling and tubing ends. As the axial tension load on the tubing 32 is progressively increased, the axial tension stress in the tubing 32 first exceeds the yield strength in tension near or within the interface between the tapered surfaces 42 and 44. The result is that the tubing joint 38 fails by necking down of the tubing end 28, starting near the outer extremity of the coupling end 24, and progressing axially into the interior of the coupling end.

To offset the foregoing effect and thus obtain a tubing joint 38 having a higher strength in tension, several alternatives are possible. First, the elastic limit of the tubing end 28 may be increased by cold working. Second, the tubing end 28 might be provided with a greater wall thickness than the nominal wall thickness of the tubing 32. Third, both the elastic limit and the wall thickness of the tubing end 28 can be increased by cold working. By cold working the tubing end 28 to increase its elastic limit only, a joint strength at least equal to the yield strength of the tubing 32 can be attained. By cold working tubing end 28 to increase its elastic limit and by cold upsetting it to increase its wall thickness, the strength of the tubing joint 38 can be made to exceed the ultimate strength of the tubing 32, whereupon failure occurs in the body of the tubing outside the joint 38. This effect may be achieved with a thickness increase of the order of 10% to 15%, which adds only a few hundredths of an inch to the outer diameter of the tubing end 28.

TUBING JOINT CONSTRUCTION 120

Referring to FIG. 2 of the drawing, illustrated therein is a tubing joint construction 120 which is generally similar to the tubing joint construction 20, the various components of the tubing joint construction 120 being identified by reference numerals higher by one hundred than those used in connection with the corresponding components of the tubing joint construction 20.

Considering the differences between the tubing joint 138 and the tubing joint 38, the coupling end 124 is inserted into the tubing end 128 and the fluid injection port 146 is formed in the tubing end. The annular seal 152 for minimizing leakage into the interface between the tapered surfaces 142 and 144 is carried by the coupling end 124 adjacent its extremity. To permit providing the coupling 122 with an inner diameter equal to the inner diameter of the tubing 132, the tubing end 128 is expanded or belled. This is preferably done by cold working to increase the elastic limit of the tubing material within the tubing end 128.

In general, the discussion presented previously in connection with the tubing joint 38 applies to the tubing joint 138 specifically, the previously presented ranges of ratios of axial interface length to elongated-element outside diameter, ranges of effective coefficients of friction, and ranges of included taper angles, all apply.

While most of the important considerations applicable to the tubing joint 38 are also applicable to the tubing joint 138, the internal coupling version does behave differently in a respect which is highly advantageous. With the internal coupling 122, the tubing end 128 has an initial axial compression stress, due to the hoop tension stress therein, which reduces the net axial tension stress when the tubing 132 is subjected to an axial tension load. Therefore, without upsetting or severe cold working of the tubing end 128, the strength of the tubing joint 138 can easily be made to exceed the ultimate strength of the tubing 132.

More specifically, with this form of joint the gripping action always increases with load even when the tubing 132 is stressed beyond the yield point and the axial stress in the tubing end 128 is always less than in the body of the tubing. Consequently, with the internal coupling 122, failure occurs in the tubing 132 proper at a point spaced from the coupling, and never in the tubing joint 138 itself. The foregoing effect is amplified by the cold working necessary to expand or bell the tubing end 128 to receive the corresponding coupling end 124. Thus, with the tubing joint 138, a joint strength in excess of the ultimate strength of the tubings can easily be attained, which is an important advantage of the internal coupling species of the invention.

The coupling and tubing ends 124 and 128 are shown in FIG. 2 as tapering in thickness in proportion to the taper of the surfaces 144 and 142. This limits the hoop tension and compression which can be developed in the tubing and coupling ends 128 and 124 for the reasons hereinbefore discussed in connection with the tubing joint 38, thereby limiting the maximum taper angle for the surfaces 142 and 144. To permit utilizing a larger taper angle, the coupling and tubing ends may be provided with constant wall thicknesses.

ROD JOINT CONSTRUCTION 220

Illustrated in FIG. 3 of the drawing is a rod joint construction 220 of the invention which is generally similar to the tubing joint construction 20, except that the elongated elements frictionally interconnected in end-to-end relation are solid rods, rather than tubings. In view of the similarity between the tubing joint construction 20 and the rod joint construction 220, the components of the latter are identified by reference numerals higher by two hundred than those used in conjunction with the corresponding components of the tubing joint construction 20. Thus, the rod joint construction 220 includes a rod joint 238 comprising an end 224 of a coupling 222 receiving therein an end 228, preferably cold upset, of a solid rod 232. The rod end 228 has an axially tapered surface 242 pressurally inter-engaged with an axially tapered internal surface 244 of the coupling end 224. The rod joint 238 may be made up and broken by injecting a fluid under high pressure into the axially central region of the interface between the tapered surfaces 242 and 244 through a port 246 formed in the coupling end 224 and communicating at its inner end with an internal annular distributing groove 248 in the coupling end 224. A radially-inwardly-converging annular seat 250 is provided at the outer end of the fluid injection port 246 to receive an injection nozzle, not shown. As in the case of the tubing joint construction 20, the two rod ends 228 and 230 are closely spaced within the coupling 222. The coupling 222 is provided therein with a bleed port 252 to drain from the space between the rod ends any injected fluid leaking thereinto so as to prevent a pressure build-up from interfering with making up of the joint 238, or its strength.

In general, the various important considerations hereinbefore discussed in connection with the external-coupling type tubing joint construction 20 are applicable to the rod joint construction 220. In other words, the same ranges of ratios of axial interface lengths to elongated-element outside diameters, the same ranges of effective coefficients of friction, and the same ranges of included taper angles, are applicable. Additionally, similar material and material-characteristic relationships may be used in the rod joint construction 220.

THE EFFECT OF DIFFERENT MODULI OF ELASTICITY

Throughout all of the foregoing background description of the tubing joints 38 and 138 and the rod joint 238, it was assumed that the moduli of elasticity of the materials of the coupling and tubing or rod ends are substantially equal in each case. This assumption holds for coupling and tubing or rod ends of steel even if the outer and inner members of each joint are made of steels having quite-different physical properties. With the steels normally used for oil well tubings, rods and couplings, the moduli of elasticity are substantially the same so that any slight differences between the moduli of elasticity of the inner and outer members of the tubing joints 38 and 138 and the rod joint 238 have only negligible effects on the strengths thereof.

However, major increases in the strengths of the tubing and rod joints 38, 138 and 238 can be achieved by utilizing for their outer members materials having substantially lower moduli of elasticity than the materials of their inner members. With this construction, upon application of an axial tension load to any of these joints, the outer member contracts relative to the inner member to a substantial extent, thereby increasing significantly the engagement pressure between the tapered surfaces of the joint as the axial tension load thereon is increased. With such a construction, a joint strength at least as high as the ultimate tubing or rod strength can be achieved very easily, particularly with the internal-coupling joint 138. Furthermore, since utilizing a substantially lower modulus of elasticity for the material of the outer member results in a very significant increase in the contact pressure between the tapered surfaces of the joint, the length of engagement between such tapered surfaces, and thus the over-all length of the joint, can be reduced without sacrificing joint strength.

In general, any combination of materials may be used for the tubing joints 38 and 138 and the rod joint 238 which provides a marked modulus-of-elasticity differential in favor of the inner member of the joint.

For example, in the external-coupling joints 38 and 238, the couplings 22 and 222 may be formed of high-strength aluminum alloys while the tubings 32 and 34 and the rods 232 and 234 are formed of steel. Under such conditions, the modulus of elasticity of the inner member of each joint is of the order of two and one-half times that of the outer member. Consequently, joint strengths exceeding the ultimate strengths of the tubings or rods may easily be achieved and/or the lengths of the joints may be reduced substantially. Since even high-strength aluminum alloys have tensile strengths which are low compared to high-strength steels, relatively thick couplings 22 and 222 are necessary compared to high-strength steel couplings. However, where coupling wall thickness is not a factor, such constructions are entirely practical.

With the internal-coupling tubing joint 138 of FIG. 2, the tubing 132 and 134 may be of steel and the coupling 122 of tungsten, which combination of materials provides a modulus-of-elasticity ratio approaching two. Again, a joint strength exceeding the tubing ultimate strength may readily be achieved and/or a reduction in joint length may be attained. Since tungsten is a high strength material, the coupling 122 can be quite thin and still achieve the foregoing results. This makes the use of a tungsten coupling 122 entirely practical for specialized applications, such as locations where space considerations necessitate a joint diameter as small as possible.

Another possible combination of metals with the internal-coupling tubing joint of FIG. 2 is to employ tubings 132 and 134 of high-strength aluminum alloys and a coupling 122 of steel.

Various other combinations of metallic and/or non-metallic materials having significantly different moduli of elasticity may be used for the inner and outer members of the various joints 38, 138 and 238.

In the external-coupling tubing joint 38, the length, L, of pressural interengagement between the tapered surfaces 42 and 44 may be determined from the equation $$L = \frac{S_x(d_1^2 - d_2^2)}{4d_1(f - \tan a/2)\left[S_t\left(\frac{d_1 - d_2}{d_1}\right) + \Delta P\right]}$$

where $$\Delta P = \frac{S_x}{K_4 K_6}\left[\frac{K_3 K_6 u_1 E_2 - K_4 K_5 u_2 E_1}{K_3 E_2 + K_5 E_1}\right]$$

In the foregoing equations for L and $\Delta P$, $S_x$ = the axial tensile stress in the tubing 32 due to axial loading of the joint 38,
$S_t$ = the maximum hoop stress in the tubing end 28,
$d_1$ = the nominal outer diameter of the tubing 32,
$d_2$ = the nominal inner diameter of the tubing 32,
$d_3$ = the outer diameter of the coupling 22,
$f$ = the effective coefficient of friction between the tapered surfaces 42 and 44,
$a$ = the included taper angle of the tapered surfaces 42 and 44,
$u_1$ = the change in the radius of the coupling end 24 due to axial loading,
$u_2$ = the change in the radius of the tubing end 28 due to axial loading,
$E_1$ = the modulus of elasticity of the coupling 22,
$E_2$ = the modulus of elasticity of the tubing 32, $$K_3 = \frac{d_1^2}{4}\left(\frac{d_1^2 + d_3^2}{d_3^2 - d_1^2} + u_1\right)$$

$$K_4 = \frac{d_1^2 + d_3^2}{d_3^2 - d_1^2}$$

$$K_5 = \frac{d_1^2}{4}\left(\frac{d_2^2 + d_1^2}{d_1^2 - d_2^2} - u_2\right)$$

and $$K_6 = \frac{d_1^2 + d_2^2}{d_1^2 - d_2^2}$$

As will be apparent from the foregoing, $\Delta P$ is the increase in contact pressure due to the axial tensile stress $S_x$ for the case where $E_1$, the modulus of elasticity of the coupling 22, is less than $E_2$, the modulus of elasticity of the tubing 32. The equation for $\Delta P$ shows that the increase in contact pressure is proportional to the difference between the moduli of elasticity divided by the sum thereof. Thus, where the difference between the two moduli is large, the increase in contact pressure is large.

It will further be apparent from the equation for L that $\Delta P$ enters into the equation for L in a manner to achieve a significant reduction in L. This means that the use of a significantly lower modulus of elasticity for the outer member of the joint achieves a substantial reduction in the required value of L, and thus in the over-all length of the joint.

Similar equations for L can be developed for the internal-coupling tubing joint of FIG. 2 and the rod joint of FIG. 3, it being thought unnecessary to present same herein. Higher moduli of elasticity for the inner members of these joints would have similar effects on ΔP and L.

Although exemplary embodiments of the invention have been illustrated herein for purposes of illustration, it will be understood that various changes, modifications and substitutions may be incorporated in such embodiments without departing from the spirit of the invention.

We claim as our invention:

1. A high-strength, friction-type joint for connecting an elongated element, such as a tubing or rod, to another element in axial tension, including:
   (a) an outer tubular member;
   (b) an inner member;
   (c) one of said members being an end portion of said elongated element;
   (d) an inner tapered surface within said outer member;
   (e) a complementary outer tapered surface on said inner member;
   (f) said tapered surfaces being pressurally interengaged along an interface therebetween with a high engagement pressure induced by a high hoop tension stress in said outer member and an opposing high compression stress in said inner member;
   (g) said high hoop tension stress and said opposing high compression stress respectively being close to but slightly less than the yield points of the materials of said outer and inner members;
   (h) the axial length of said tapered surfaces in pressural interengagement with each other being so related to the engagement pressure between said tapered surfaces and the effective coefficient of friction therebetween as to produce a high frictional resistance to relative bodily displacement of said tapered surfaces;
   (i) said material of said outer member having a lower modulus of elasticity than said material of said inner member so that upon application of said axial tension to said joint said outer member contracts relative to said inner member to thereby increase the engagement pressure between said tapered surfaces and achieve a joint strength exceeding the yield strength and at least equal to the ultimate strength of said elongated element; and
   (j) whereby the contraction of said outer member onto said inner member is temporary.

2. A high-strength, friction-type joint as defined in claim 1 wherein said outer member is an end portion of a coupling.

3. A high-strength, friction-type joint as defined in claim 1 wherein said outer member is an end portion of a coupling and said inner member is an end portion of a tubing.

4. A high-strength, friction-type joint as defined in claim 1 wherein said outer member is an end portion of a coupling and said inner member is an end portion of a rod.

5. A high-strength, friction-type joint as defined in claim 1 wherein said outer member is an end portion of a tubing.

6. A high-strength, friction-type joint as defined in claim 1 wherein said outer member is an end portion of a tubing and said inner member is an end portion of a coupling.

7. A string of elongated elements, such as tubings or rods, interconnected in end-to-end relation by high-strength, friction-type joints and suspended in an oil well in axial tension, each of said joints including:
   (a) an outer tubular member;
   (b) an inner member;
   (c) one of said members being an end portion of one of the elongated elements interconnected by said joint;
   (d) an inner tapered surface within said outer member;
   (e) a complementary outer tapered surface on said inner member;
   (f) said tapered surfaces being pressurally interengaged along an interface therebetween with a high engagement pressure induced by a high hoop tension stress in said outer member and an opposing high compression stress in said inner member;
   (g) said high hoop tension stress and said opposing high compression stress respectively being close to but slightly less than the yield points of the materials of said outer and inner members;
   (h) the axial length of said tapered surfaces in pressural interengagement with each other being so related to the engagement pressure between said tapered surfaces and the effective coefficient of friction therebetween as to produce a high frictional resistance to relative bodily displacement of said tapered surfaces;
   (i) said material of said outer member having a lower modulus of elasticity than said material of said inner member so that said axial tension in said string causes said outer member to contract relative to said inner member to thereby increase the engagement pressure between said tapered surfaces and achieve a joint strength at least equal to the ultimate strength of the elongated elements interconnected by said joint; and
   (j) whereby the contraction of said outer member onto said inner member is temporary.

References Cited

UNITED STATES PATENTS

| | | | |
|---|---|---|---|
| 2,671,949 | 3/1954 | Welton | 29—148.2 |
| 2,992,479 | 7/1961 | Musser et al. | 29—421 |
| 3,142,901 | 8/1964 | Bodine | 29—525 |
| 3,208,776 | 9/1965 | Buschow | 285—284 |
| 2,769,318 | 11/1956 | Grenell | 285—173 X |
| 2,899,806 | 8/1959 | Fye | 29—427 X |
| 2,926,940 | 3/1960 | Maass | 29—427 X |
| 3,114,566 | 12/1963 | Coberly et al. | 285—18 |
| 3,126,214 | 3/1964 | Wong et al. | 285—381 X |

FOREIGN PATENTS 825,766  12/1959  Great Britain.

THOMAS F. CALLAGHAN, Primary Examiner

U.S. Cl. X.R.

285—332.2, 381